United States Patent

Yamamoto et al.

[11] Patent Number: 5,838,477
[45] Date of Patent: Nov. 17, 1998

[54] OPTICAL SUBMARINE BRANCHING DEVICE

[75] Inventors: Shu Yamamoto, Shiki; Noboru Edagawa, Higashimatsuyama; Hidenori Taga, Sakado; Tetsuyuki Miyakawa, Kawaguchi, all of Japan

[73] Assignee: Kokusai Denshin Denwa Kabushiki Kaisha, Tokyo, Japan

[21] Appl. No.: 727,678

[22] Filed: Oct. 8, 1996

[30] Foreign Application Priority Data

Oct. 18, 1995 [JP] Japan .................................. 7-293827

[51] Int. Cl.⁶ .............................. H04J 14/02; H04B 10/17
[52] U.S. Cl. .......................... 359/179; 359/110; 359/130; 359/141; 359/161
[58] Field of Search ..................... 359/110, 124, 359/125, 127, 141, 161, 174, 179, 128, 130, 177, 176; 385/16, 24, 25

[56] References Cited

U.S. PATENT DOCUMENTS

| | | | |
|---|---|---|---|
| 4,978,189 | 12/1990 | Blonder et al. | 359/24 |
| 5,026,137 | 6/1991 | Tokumitsu | 359/154 |
| 5,204,771 | 4/1993 | Koga | 359/281 |
| 5,615,290 | 3/1997 | Harasawa et al. | 359/124 |
| 5,633,741 | 5/1997 | Giles | 359/124 |

*Primary Examiner*—Leslie Pascal
*Attorney, Agent, or Firm*—Lackenbach Siegel Marzullo Aronson & Greenspan, P.C.

[57] ABSTRACT

An optical submarine branching unit employing an optical circuit structure which is small in the number of optical components used, permits reduction of optical insertion loss and is well compatible with the ADD/DROP function suitable for use in wavelength multiplex transmission. An optical fiber pair provided in an optical submarine cable connecting between first and second points is branched toward a third point, an optical circulator capable of reversing the direction of rotation of an optical input/output is provided as optical switching means by which, in the event of a failure in the branch transmission system having the branched optical fiber pair, the optical fiber pair is connected between the first and second points directly without being branched to the third point.

5 Claims, 8 Drawing Sheets

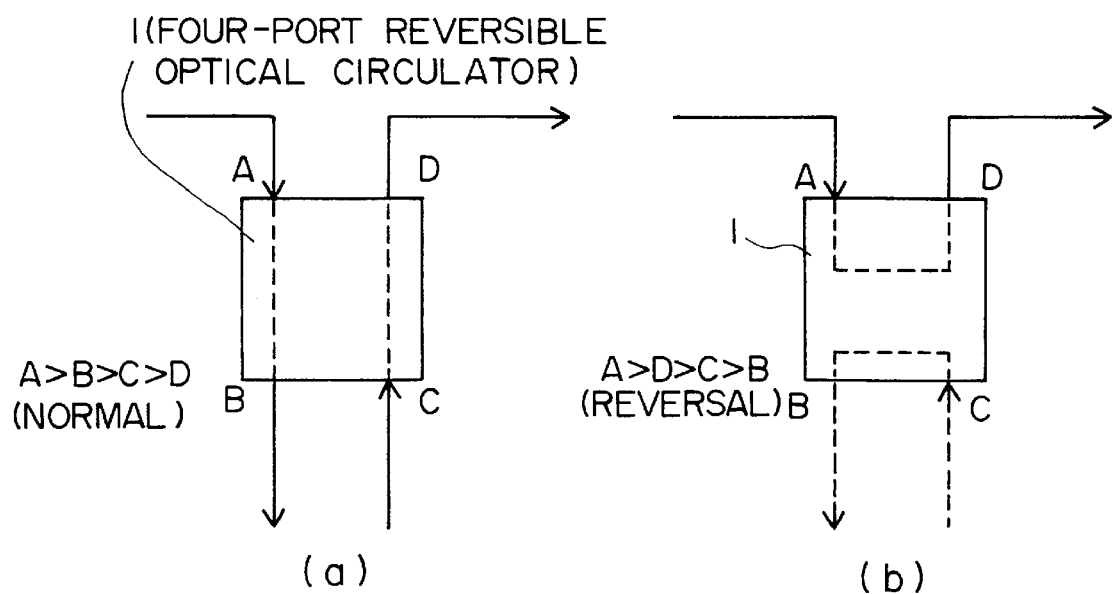
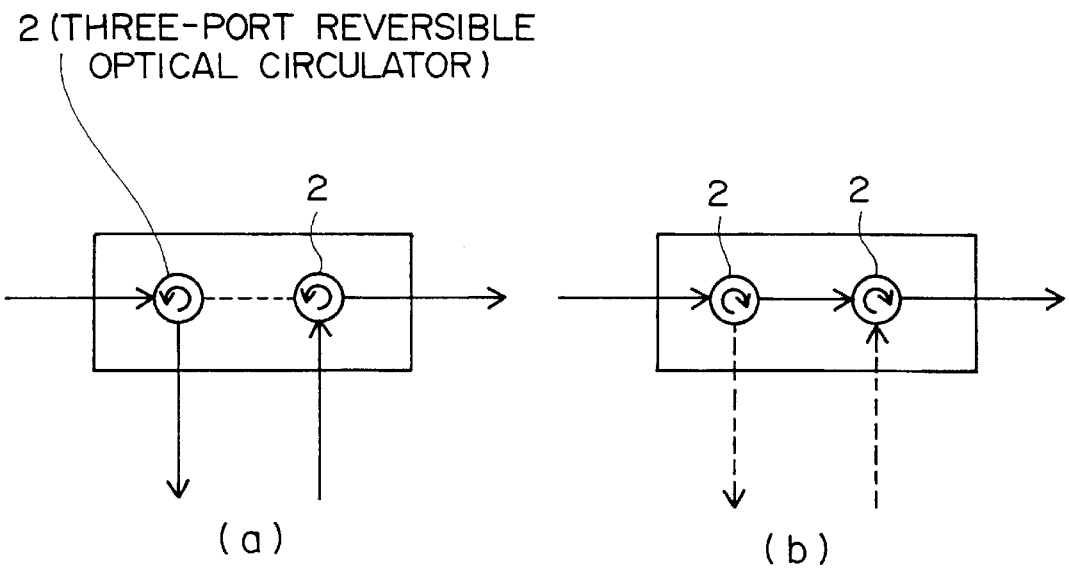

(a) NORMAL (b) REVERSAL

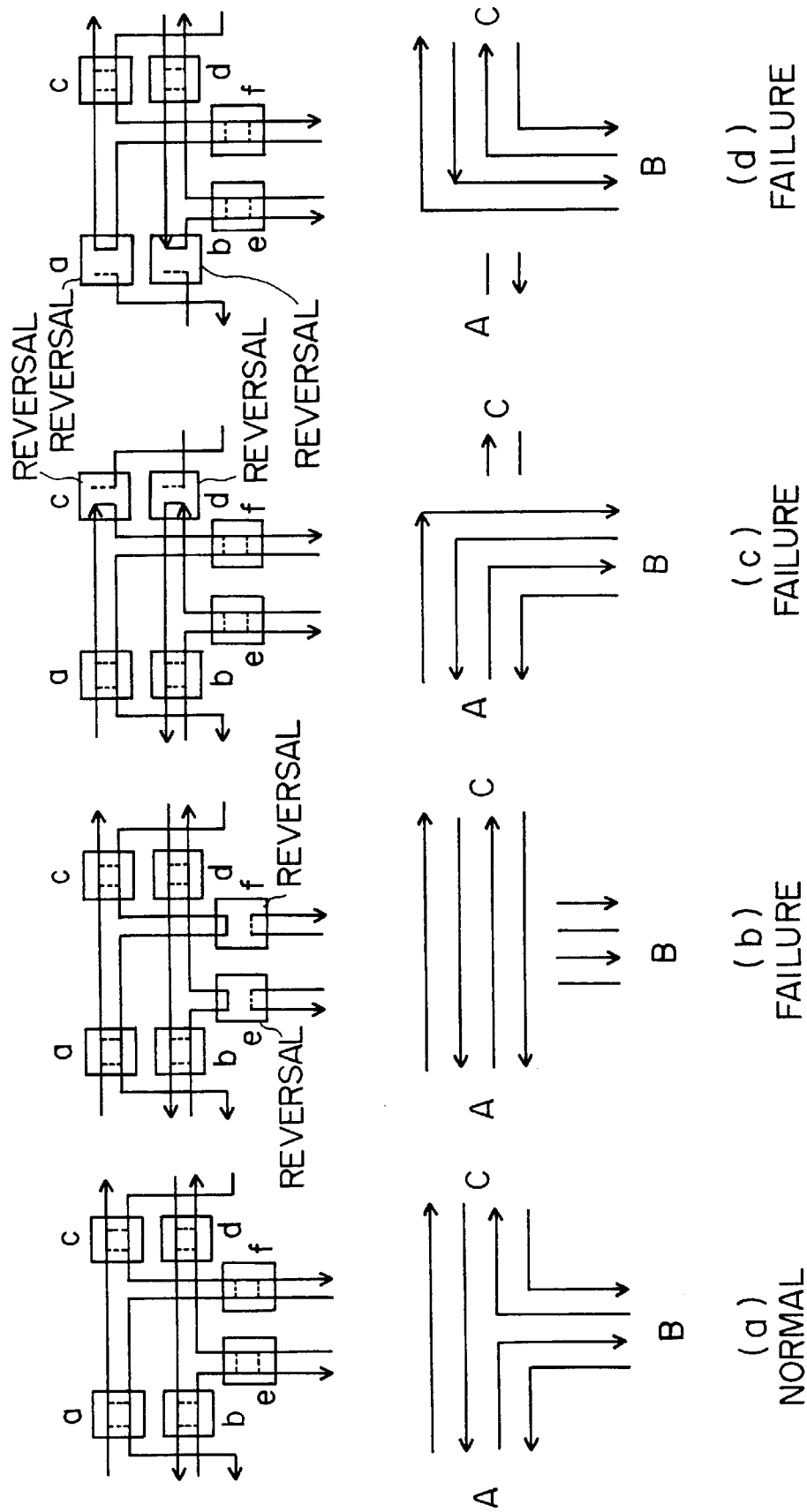

(a) NORMAL (b) REVERSAL (a) NORMAL (b) REVERSAL (a) NORMAL (b) REVERSAL (a) NORMAL (b) REVERSAL

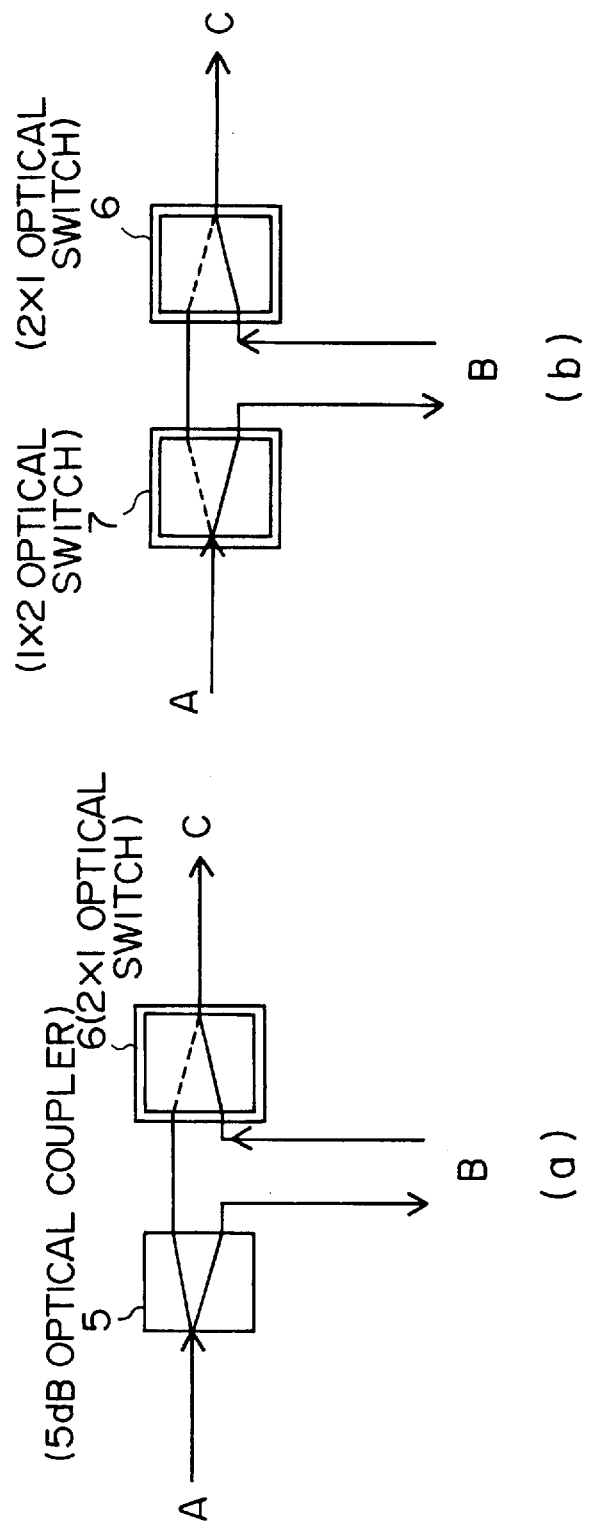

OPTICAL SUBMARINE BRANCHING DEVICE

BACKGROUND OF THE INVENTION

The present invention relates to a device for branching optical signals which are transmitted over an optical submarine cable of an optical submarine cable system and, more particularly, to an optical submarine branching unit which, when the optical submarine system develops a fault, permits switching of the signal transmission path to circumvent the fault.

The optical submarine cable system allows ease in physically changing the transmission path of optical signals by branching or switching fiber pairs provided in the optical submarine cable, and hence it enables a multipoint communication through the use of an optical submarine branching unit. Furthermore, the transmission path of lightwave signals can be switched by using optical switches in the branching device. With such an arrangement, if a failure occurs in a branched transmission system having the branched fiber pair, for instance, the signals can be switched to an alternative path bypassing the faulty portion.

Heretofore, there has been employed such a configuration as shown in FIG. 11(a) which uses a 3 dB optical coupler 5 and a 2 by 1 optical switch 6 and activates the latter to switch an optical signal branched path from a point A to B to a path from the point A to C. When the insertion loss of the 3 dB optical coupler 5 becomes an issue, it is also possible to employ such a configuration as shown in FIG. 11(b) which uses, in place of the 3 dB optical coupler 5, a 1 by 2 optical switch 7 in ganged relation to the 2 by 1 optical switch 6 to reduce the insertion loss although the number of switches used increases.

There has been put into use an optical submarine branching device for an optical submarine cable system which connects among three locations through utilization of such a basic configuration of an optical branching unit or optical switching unit as shown in FIG. 11 [see, for example, Literature-1 (Y. Niiro, H. Wakabayashi, H. Yamamoto, Y. Ishikawa, "The OS-280M optical fiber submarine cable system", SUBOPTICS' 86)]. To obtain four connections of the signal path (a) normal and (b), (c), (d) at fault in the three-point; communication as shown in FIG. 12, it is possible to use such an optical submarine branching unit 8 as depicted in FIG. 13 which comprises optical switches 6, 3 dB optical splitters 5 and optical couplers 9 through utilization of the basic configuration of FIG. 11(a).

With the prior art configuration of FIG. 13, however, optical loss by the 3 dB optical splitters 5 and the optical couplers 9 is large and the number of optical parts used is also large. The substitution of optical switches for the 3 dB optical splitters with a view to reducing the optical loss will lead to an increase in the number of moving optical components involved. On the other hand, there has recently been developed an optical submarine cable system employing a wavelength multiplex transmission system and an ADD/DROP multiplxer is now under study which is an optical submarine branching unit and adds or drops only a certain wavelength [see Literature-2 (C. R. Giles, V. Mizrahi, "Low-Loss ADD/DROP Multiplexers for WDM lightwave Networks", IOOC' 95)]. When combined with a conventional system utilizing the optical path changing facility by optical switches, the branching unit will suffer the drawback of complex switching structure.

SUMMARY OF THE INVENTION

An object of the present invention is to provide an optical submarine branching unit of optical circuitry which is small in the number of optical components, permits reduction of optical insertion loss and is well compatible with the ADD/DROP function suitable for wavelength multiplex transmission.

To attain the above object, an optical submarine branching unit of the present invention is proposed in which an optical fiber pair provided in an optical submarine cable connecting between first and second points is branched toward a third point, is characterized by the provision of an optical circulator capable of reversing the direction of rotation of an optical input/output as optical switching means by which when the branched transmission line containing the branched optical fiber pair is in failure, the first and second points are interconnected directly without connecting the branched optical fiber pair to the third point.

The branching unit using the above-mentioned optical switching means is characterized by a structure in which two-way interconnections are established between the first and second points, between the first and third points and between the second and third points and when a failure occurs in any one of the three transmission systems between the first and second points, between the first and third points and between the second and third points, the other remaining two transmission systems are selected to circumvent the failed transmission system.

The optical submarine branching unit according to the present invention uses, as an optical component for switching the optical path, only a four-port or three-port optical circulator which is capable of reversing the direction of rotation of the optical input/output, by which all the signal paths shown in FIG. 12 can be established for the optical fiber pair contained in the optical submarine cable to be branched.

For the transmission of wavelength-multiplex signals, it is possible to employ a structure in which a band rejection type, optical filter or band pass type optical filter, which adds/drops a given wavelength, is inserted in each optical fiber pair to be branched and, during normal operation, permits or inhibits the transmission therethrough of only the given wavelength, whereas in the event of failure in the branched transmission system the direction of rotation of the optical circulator is reversed so that multiplexed wavelength are all allowed to pass through the optical fiber without being branched.

An optical fiber grating can be used as the above-mentioned band rejection type optical filter, and a right angle incidence type band pass optical filter can be used as the optical band pass filter.

In the case of the ADD/DROP branching device for transmitting the wavelength multiplex signal, it is possible to employ a structure which uses two four-port reversible optical circulators and one optical fiber grating and in which during normal operation a required wavelength is added or dropped and, by reversing the direction of rotation of each optical circulator, all the multiplexed wavelengths are allowed to pass through the optical fiber grating without being branched.

Thus, the optical circuit structure of the submarine branching unit equipped with the optical path switching function is simplified and the insertion loss is reduced. This increases the reliability and improves the transmission characteristic of the submarine branching unit of the optical submarine transmission system. Further, the optical submarine branching unit of the present invention includes provisions for the ADD/DROP function in the wavelength multiplex transmission, allowing ease in developing a network of optical submarine cable systems through utilization of wavelength multiplexing technology.

BRIEF DESCRIPTION OF THE DRAWING

The present invention will be described in detail below with reference to accompanying drawings, in which:

FIGS. 1a and 1b show circuit diagrams illustrating an embodiment of a basic structure for an optical branching unit according to a first aspect of the present invention;

FIGS. 2a and 2b show circuit diagrams illustrating an embodiment of a basic structure for an optical branching unit according to a third aspect of the present invention;

FIGS. 4a, 4b, 4c and 4d show circuit diagrams explanatory of how the three-point interconnecting paths are switched in the embodiment of FIG. 3;

FIGS. 11a and 11b show circuit diagrams showing a basic structure of conventional switching means;

PREFERRED EMBODIMENTS OF THE INVENTION

Embodiment 1

FIG. 1 shows diagrams explanatory of the principle of the present invention.

As shown in FIG. 1(a), a four-port reversible optical circulator 1 is used, in which ports are normally connected in the order of A–B–C–D and input signals via the ports A and C are output via the ports B and D, respectively. When a failure occurs in the A-to-B transmission line, a drive current is applied across a magnetic field reversing relay coil of the optical circulator 1 having a Faraday element to reverse the direction of optical connection to A–D–C–B. As the result of this, the input to the port A is output via the port D as shown in FIG. 1(b). When an input is applied to the port C it is output via the port B. FIGS. 2(a) and (b) illustrate a case of using two three-port reversible optical circulators 2 in place of the four-port reversible optical circulator used in ciruitry shown in the FIGS. 1(a)(b). By simultaneously reversing the two three-port reversible optical circulators 2, the same results as obtainable with the circuitry shown in FIGS. 1(a)(b) can be produced.

Embodiment 2

Figure 3:
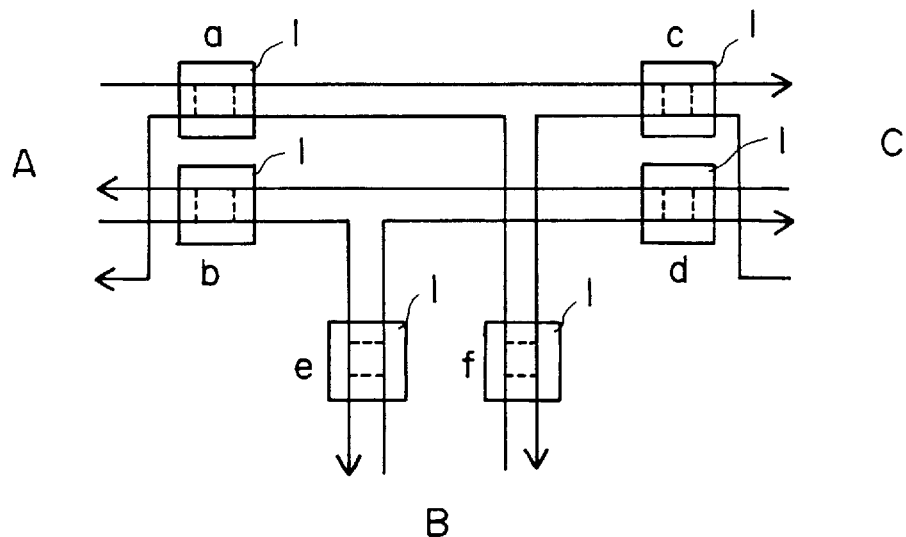
FIG. 3 is a circuit diagram illustrating an embodiment of an optical submarine branching unit capable of three-point interconnecting paths according to the first and second aspects.
Figure 12:
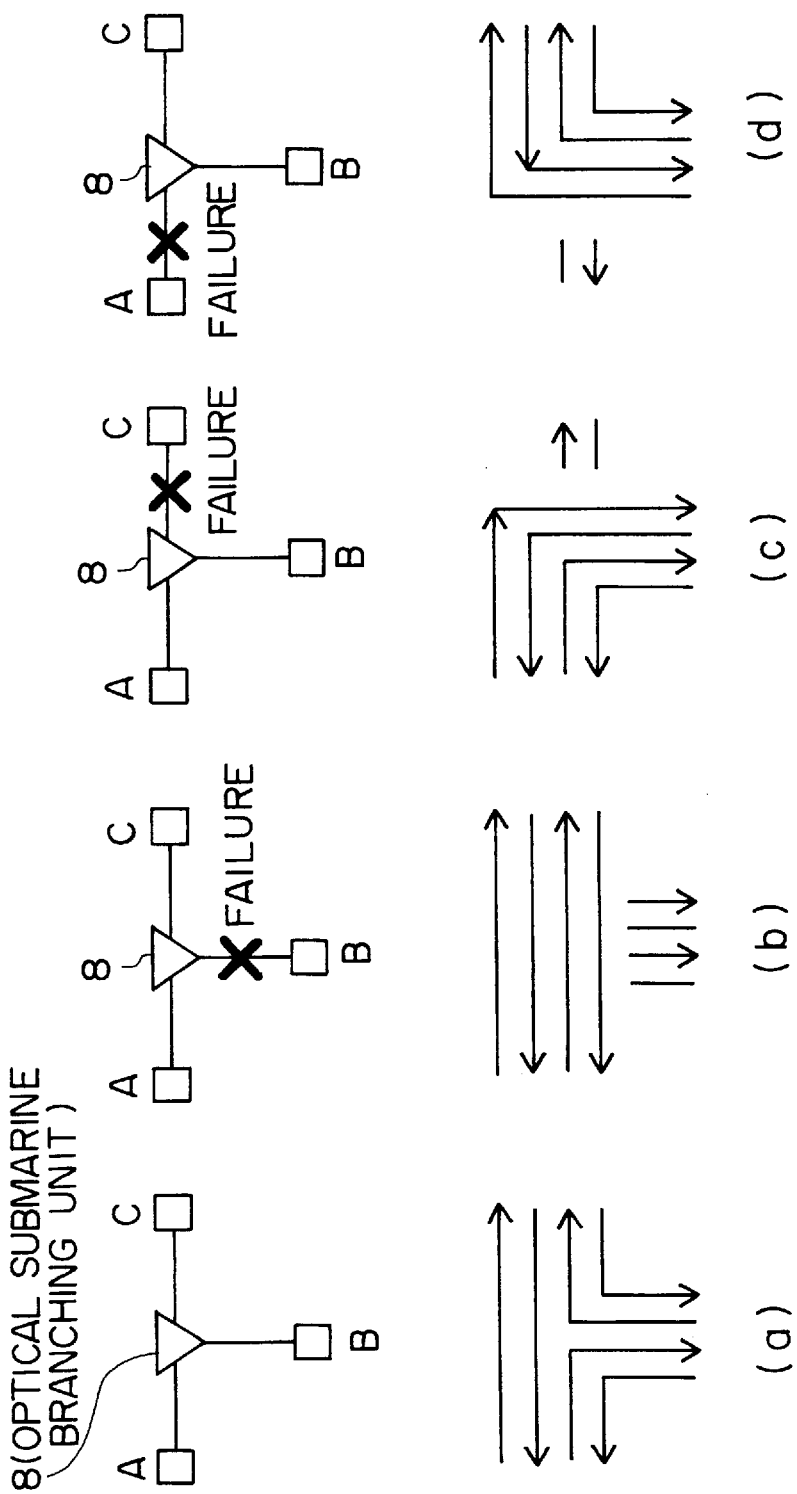
FIGS. 12a, 12b, 12c and 12d circuit diagrams showing optical paths of an optical submarine branching unit, (a) during a normal operation and (b), (c), (d) in the event of a failure.

FIG. 3 illustrates a second embodiment which is intended to realize a second feature of the present invention through utilization of the basic structure of FIG. 1 and in which two-way interconnections of optical fiber pairs to be connected to three points A, B and C can be established between the points A and B, between the points A and C, and between the points B and C, thereby obtaining all the connections of optical paths depicted in FIG. 12.

FIG. 4 shows how the optical circulators operate for each connection.

FIG. 4(a) shows the connection of optical paths during normal operation. FIG. 4(b) shows a case where optical circulators e and f are reversed to disconnect traffic between the points A and B and between C and B, transmitting traffic only between the points A and C. FIG. 4(c) shows a case where optical circulators c and d are reversed to disconnect traffic between the points A and B and between the points B and C, transmitting traffic only between the points A and B. FIG. 4(d) shows a case where optical circulators a and b are reversed to cut off traffic between the points A and C and between the points A and B, transmitting traffic only between the points B and C.

Embodiment 3

Figure 5:
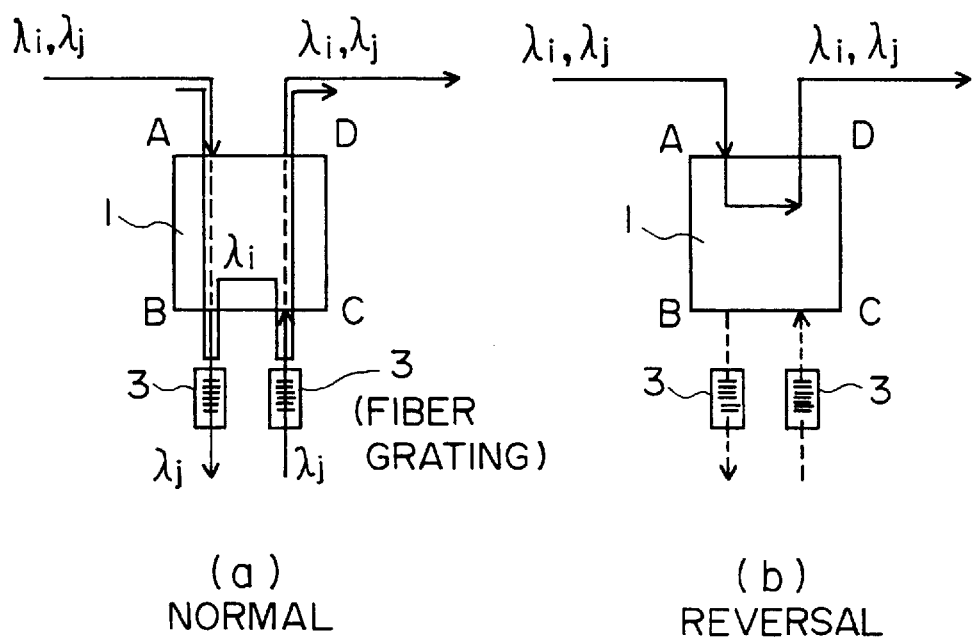
FIGS. 5a and 5b show circuit diagrams illustrating a basic structure of an optical branching unit equipped with the ADD/DROP function according to fourth and fifth aspects of the present invention which uses optical fiber gratings as wavelength-rejection optical filters.
Figure 6:
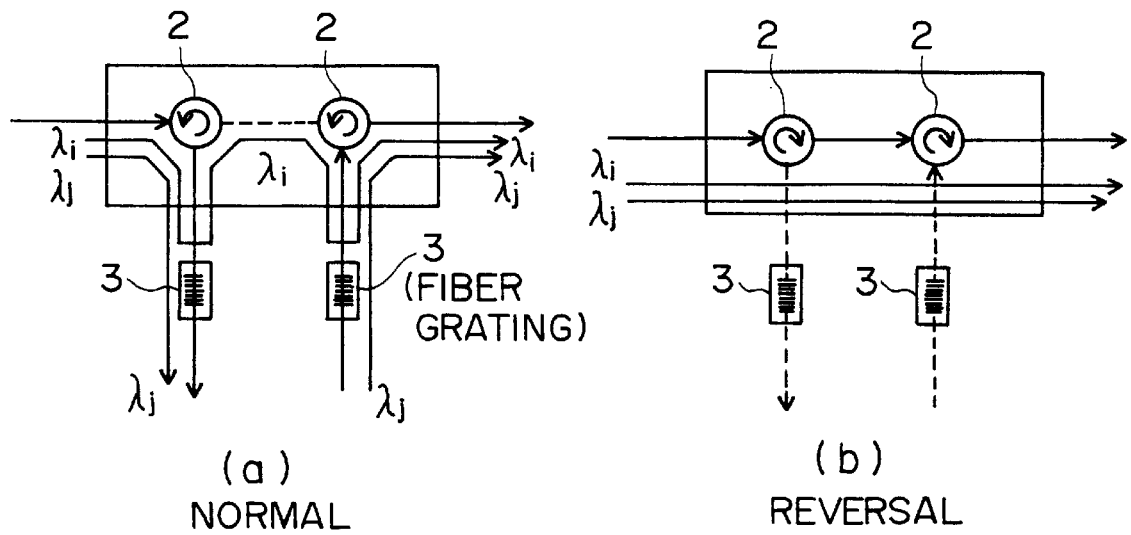
FIGS. 6a and 6b show circuit diagrams illustrating a basic structure of an optical branching unit equipped with the ADD/DROP function according to the fourth and fifth aspects of the present invention which uses optical fiber gratings as wavelength-rejection optical filters.

FIGS. 5 and 6 illustrate embodiments which are additionally equipped with the wavelength multiplex signal ADD/DROP function in Embodiment 1 to realize a fourth or fifth feature of the present invention.

In FIG. 5, optical fiber gratings 3, which reject the same wavelength; $\lambda_i$, are respectively connected at the ports B and C of the four-port reversible optical circulator 1. During normal operation those of wavelength multiplex signals applied via the port; A which are of wavelengths other than $\lambda_i$ can be branched as shown in FIG. 5(a), and similarly, those of input signals via the port B which are of wavelengths other than $\lambda_i$ can be inserted. On the other hand, the signal of the wavelength $\lambda_i$ applied via the port A is reflected at the ports B and C and is output via the port D. In the event of a failure in the branch transmission system connected to the port B, the four-port reversible optical circulator 1 is reversed as depicted in FIG. 5(b), by which the signals of all wavelengths applied via the port A can be output via the port D.

With this structure, signals of all wavelengths are allowed to bypass a fault in the wavelength-multiplexed signal ADD/DROP branching device.

FIG. 6 shows a case of using two three-port reversible optical circulators 2 to form the optical switching means, and the operation in this case is the same as in the case of FIG. 5.

Figure 7:
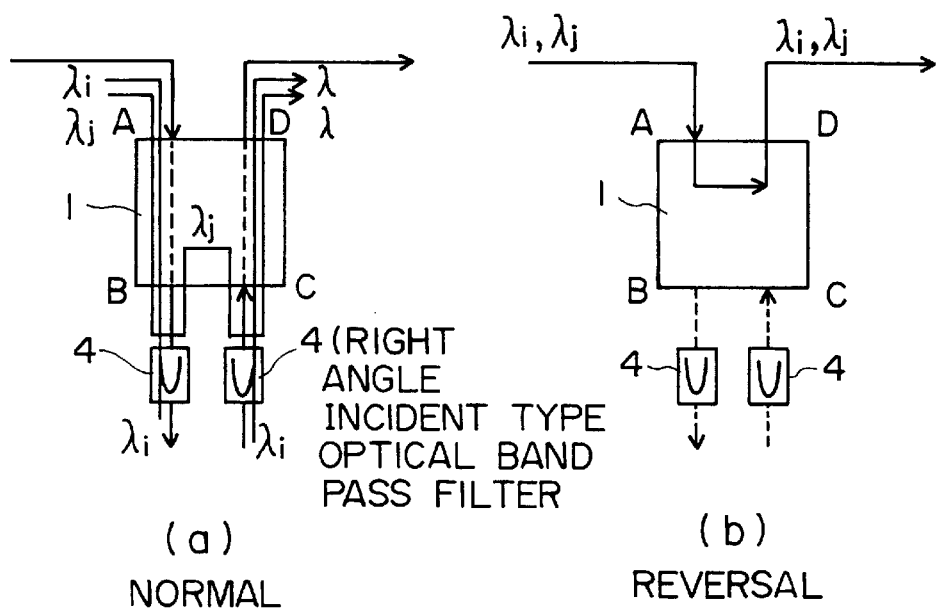
FIGS. 7a and 7b show circuit diagrams illustrating a basic structure of an optical branching unit equipped with the ADD/DROP function according to the fourth and fifth aspects of the present invention which uses right angle incidence type optical band pass filters as optical band pass filters.

In a circuit of FIG. 7, vertical incidence type optical band pass filters 4, which permit the transmission therethrough of the same wavelength, are connected to the ports B and C of the four-port reversible optical circulator 1. Normally, as shown in FIG. 7(a), that one of the wavelength-multiplex signal input via the port A which has the wavelengths $\lambda_i$ is branched and the signals of the other wavelengths are reflected at the ports B and C and are output via the port D. Further, only the signal of the wavelength $\lambda_i$ input via the port C is allowed to pass through the optical circulator for output via the port D.

Also with this structure, when a failure occurs in the branch transmission system connected to the port B, input signals of all the wavelengths via the port A can be output via the port D by reversing the four-port reversible optical circulator 1 as shown in FIG. 7(b).

Figure 8:
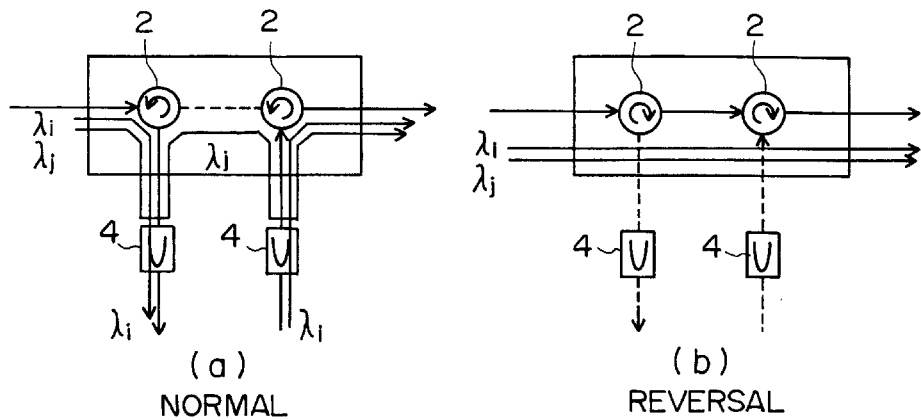
FIGS. 8a and 8b show circuit diagrams illustrating a basic structure of an optical branching unit equipped with the ADD/DROP function according to the fourth and fifth aspects of the present invention which right angle incidence type optical band pass filter as optical band pass filters.

FIG. 8 shows a case of using two three-terminal reversible optical circulators 2 to form the optical switching means, and the operation in this case is the same as in the case of FIG. 7.

Embodiment 4

Figure 9:
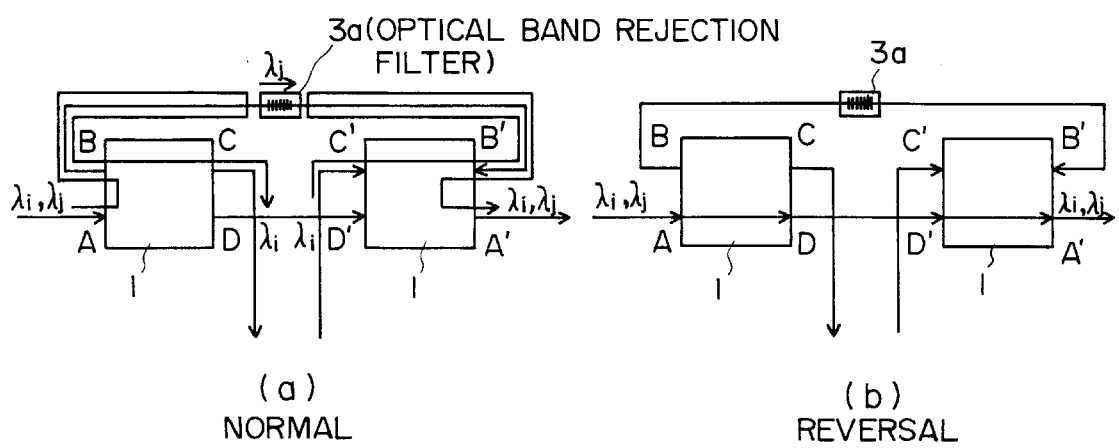
FIGS. 9a and 9b show circuit diagrams illustrating a basic structure of an optical branching unit which has the wavelength-multiplex signal ADD/DROP function and the optical path switching function according to a sixth aspect of the present invention.

FIG. 9 illustrates an embodiment which is intended to realize a sixth feature of the present invention.

As shown in FIG. 9(a), in the left-hand first four-port circulator 1 a signal produced by wavelength-multiplexing the wavelengths $\lambda_i$ and $\lambda_j$ is input via the port A, then passes through the port D and only the signal of the wavelength $\lambda_i$ is rejected by a band rejection optical filter 3a. On the other hand, the signal of the other wavelength $\lambda_j$ having passed through the band rejection optical filter 3a is connected to a port B' of the second four-port reversible optical circulator 1 and output via a port A'. Further, the signal of the wavelength $\lambda_i$ is input via the port B' and rejected by the band rejection optical filter 3a via the port B', then it is multiplexed with the signal of the other wavelength $\lambda_j$ having passed through the optical filter and the multiplexed signal is output via the port A'. The ports D and D' are directly connected to each other.

When a failure occurs in the path connected to the port B, the two four-port reversible optical circulators 1 are reversed as shown in FIG. 9(b), by which the multiplex signal applied via the port A is output via the ports A and D' to the port A'.

Figure 10:
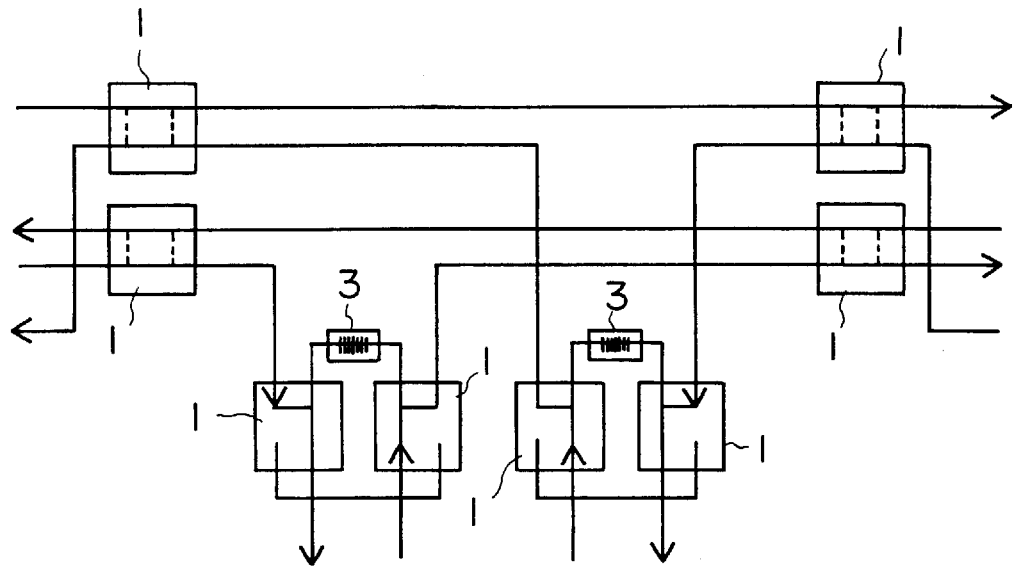
FIG. 10 is a circuit diagram illustrating the structure of an optical submarine branching unit equipped with the wavelength multiplex signal ADD/DROP function according to the sixth aspect of the present invention.
Figure 13:
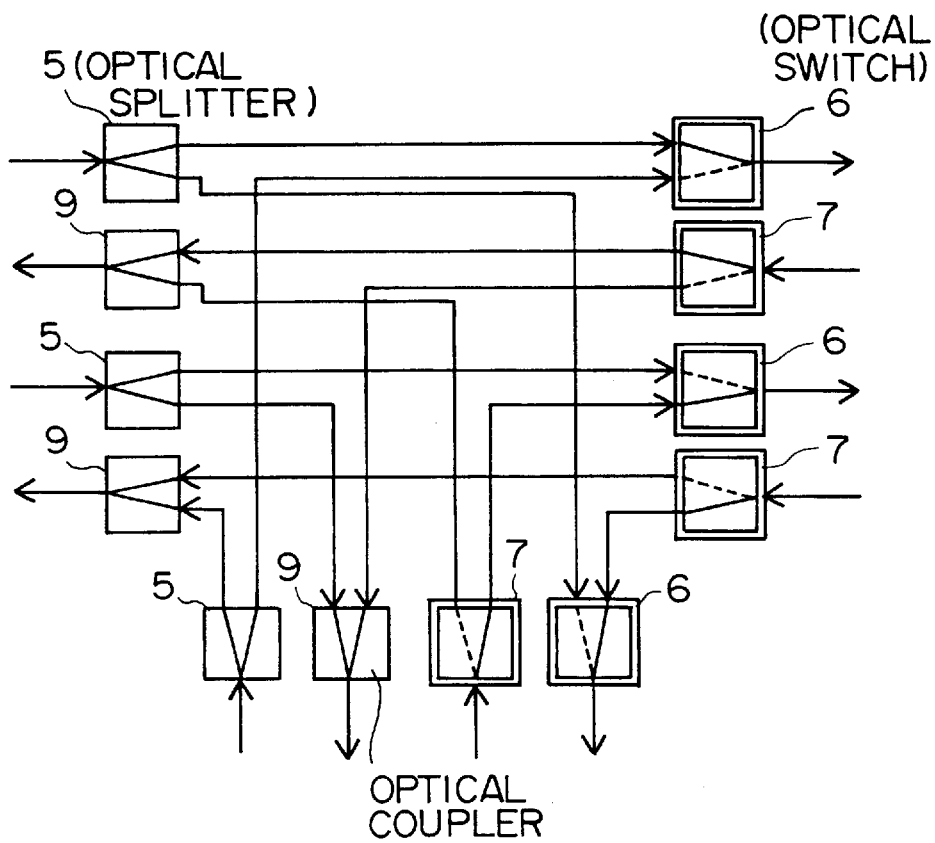
FIG. 13 is a circuit diagram showing an optical circuit structure of a conventional optical submarine branching device using the optical switching means of FIG. 11.

FIG. 10 illustrates an embodiment which is equipped with an optical multiplex signal ADD/DROP branching function and the path changing function in the event of a failure by using the ADD/DROP structure in the ADD/DROP path.

As described above in detail, according to the present invention, it is possible to reduce the insertion loss of optical path switching means and simplify the optical circuit structure in the submarine branching unit equipped with the optical path switching function, by using one four-port reversible optical circulator or two three-port reversible optical circulators as, optical switching means. This increases the reliability of the optical submarine branching unit having the optical path switching function and improves its transmission loss.

Moreover, according to the present invention, an optical wavelength selecting element is connected to the output of each optical circulator to add the function of ADDING/DROPPING a portion of a wavelength-multiplex signal, by which an optical submarine branching device with the optical path switching function suitable for use in the wavelength-multiplex transmission can be implemented with a simple structure.

What we claim is:

1. An optical submarine branching unit, in which two pairs of optical fibers provided in an optical submarine cable are connected between first and second points and are branched to another two pairs of optical fibers at a third point, to establish two-way interconnections between said first and second points, between said first and third points and between said second and third points;

said optical submarine branching unit comprising three pairs of optical four-port circulators each capable of reversing the direction of rotation of the optical input/output thereof as optical switching means, each pair of said three pairs of optical four-port circulators being respectively inserted in said two pairs of optical fibers at said first point and said second point and in said two pairs of optical fibers at said third point, by which when a failure occurs in any one of the three transmission systems between said first and second points, between said first and third points and between said second and third points, the other remaining two of said three transmission systems are interconnected directly to circumvent the failed transmission system.

2. An optical submarine branching unit, in which an optical fiber provided in an optical submarine cable is connected between first and second points and is branched to another optical fiber pair connected at a third point, to establish a wavelength-division one-way multiplex (WDM) transmission system from said first point to said second point, from said first point to said third point and from said third point to said second point for transmitting a transmission signal obtained by multiplexing optical signals of multiple wavelengths;

said optical submarine branching unit comprising an optical four-port circulator capable of reversing the direction of rotation of the optical input/output thereof as an optical switching means, and a pair of wavelength-rejection optical filters or a pair of optical band pass filters each inserted in each fiber of said branched other fiber pair, by which during normal operation only a part of said multiplexed optical signals is branched from or inserted in one of said other branched fiber pairs and, in the event of a failure in the transmission system having said failed branched fiber pair, said optical switching means operating to transmit all of said multiplexed optical signals from said first point to said second point without branching any one of them.

3. An optical submarine branching unit, in which an optical fiber provided in an optical submarine cable is connected between first and second points and is branched to another optical fiber pair connected at a third point, to establish a wavelength-division one-way multiplex (WDM) transmission system from said first point to said second point, from said first point to said third point and from said third point to said second point for transmitting a transmission signal obtained by multiplexing optical signals of multiple wavelengths;

said optical submarine branching unit comprising a cascade connection of two three-port circulators each capable of reversing the direction of rotation of the optical input/output thereof as optical switching means, and a pair of wavelength-rejection optical filters or a pair of optical band pass filters each inserted in each fiber of said branched other fiber pair, by which during normal operation only a part of said multiplexed optical signals is branched from or inserted in one of said branched other fiber pairs and, in the event of a failure in the transmission system having said branched fiber pair, said optical switching means is operated to transmit all of said multiplexed optical signals from said first point to said second point without branching any one of them.

4. An optical submarine branching unit according to claims 2 or 3, in which said wavelength-rejection optical filter is an optical fiber grating and that said optical band pass filter is a right angle incidence type optical band pass filter.

5. An optical submarine branching unit, in which an optical fiber provided in an optical submarine cable is connected between first and second points and is branched to another optical fiber pair connected at a third point, to establish a wavelength-division one-way multiplex (WDM) transmission system from said first point to said second point, from said first point to said third point and from said third point to said second point for transmitting a transmission signal obtained by multiplexing optical signals of multiple wavelengths;

said optical submarine branching unit comprising two four-port optical circulators and a wavelength band rejection optical filter; said two four-port optical circulators each capable of reversing the direction of rotation of the optical input/output thereof to be used as optical switching means; first one of said two four-port optical circulators having a first port A, a second port B, a third port C and a fourth port D; a second one of said two four-port optical circulators having a first port A', a second port B', and third port C' and a fourth port D'; an input of said wavelength band rejection optical filter being connected to the second port B adjacent to the first port A used as an input port, to output a resulting reflected signal via the third port C adjacent said second port B to branch said transmission signal to one of said other optical fiber pairs and to output said transmission signal via said fourth port D to said fourth port D' of the second four-port optical circulator; said transmission signal having passed through said second four-port optical circulator which is outputted via said port A', which is one of ports adjacent said fourth port D'; the other of said other optical fiber pairs being connected to said third port C', which is the other of the ports adjacent said fourth port D'; the wavelength of the signal rejected by said wavelength band rejection filter is a branch side input reflected by said wavelength band rejection filter to return the rejected signal to said second port B' intermediate between said first port A' and said third port C', whereby during normal operation transmission is secured between said ports A and A', between said ports A and C, and between said ports C' and A' and when said two four-port optical circulators are reversed, transmission is secured only between said ports A and A'.

* * * * *